March 5, 1963 W. B. DEAN ETAL 3,080,198
FABRICATED SPOKED WHEEL
Filed Sept. 19, 1960 2 Sheets-Sheet 1

INVENTORS.
Walter B. Dean
Henry W. Wessells III
Benjamin Labaree
BY
Wm. R. Glisson
ATTORNEY March 5, 1963 W. B. DEAN ETAL 3,080,198
FABRICATED SPOKED WHEEL
Filed Sept. 19, 1960 2 Sheets-Sheet 2

INVENTORS
Walter B. Dean
BY Henry W. Wessells III
Benjamin Labaree
Wm. R. Glisson
ATTORNEY United States Patent Office 3,080,198
Patented Mar. 5, 1963

3,080,198
FABRICATED SPOKED WHEEL
Walter B. Dean, Narberth, Henry W. Wessells III, Ardmore, and Benjamin Labaree, Philadelphia, Pa., assignors to The Budd Company, Philadelphia, Pa., a corporation of Pennsylvania
Filed Sept. 19, 1960, Ser. No. 56,710
10 Claims. (Cl. 301—64)

This invention relates to a fabricated spoked wheel and method of making it and has for an object the provision of improvements in this art.

One of the particular objects is to provide a wheel which is very strong and sturdy.

Another object is to provide a wheel which is very light.

Another object is to provide wheel structure which is easy to make and assemble.

Another object is to provide improved and simple means for making an attachment to the wheel.

Another object is to provide an improved method of making a wheel.

The above and other objects and advantages of the invention will be apparent from the following description of an exemplary embodiment, reference being made to the accompanying drawings wherein.

Figure 1:
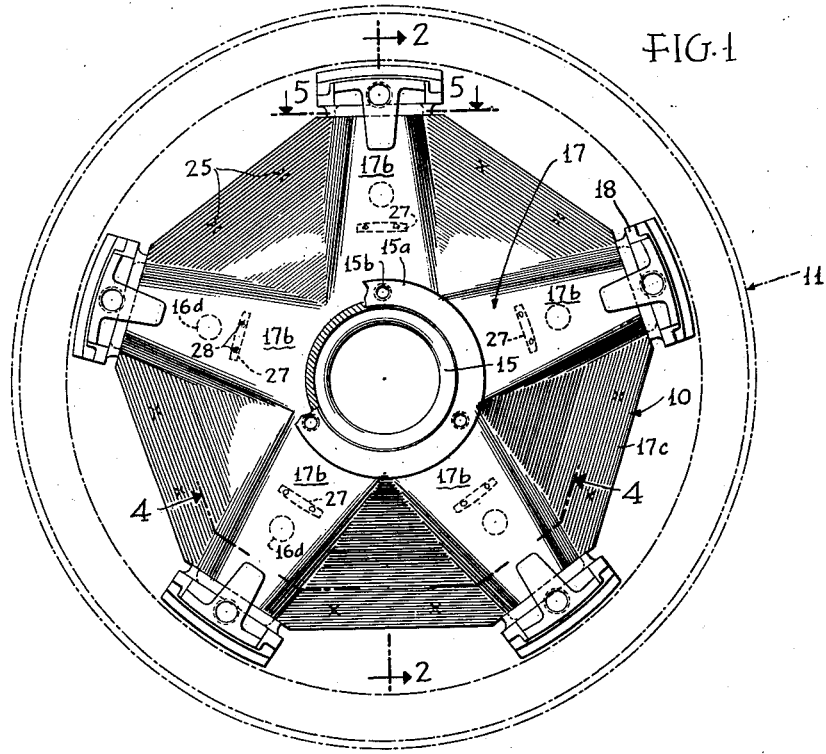
FIG. 1 is a side elevation of an automobile wheel embodying the invention.
Figure 4:
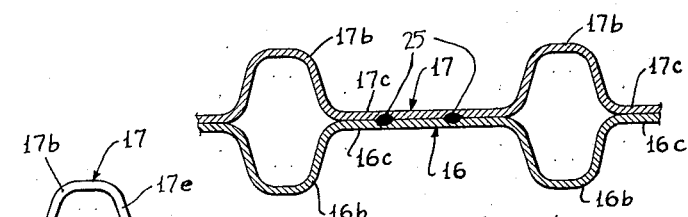
FIG. 4 is a partial transverse section taken on the line 4—4 of FIG. 1.
Figure 6:
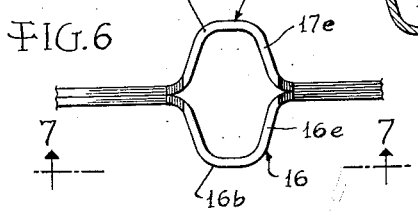
FIG. 6 is an end view of a spoke prior to the time a spoke cap is flash-welded thereto, the view being taken on the line 6—6 of FIG. 7.
Figure 7:
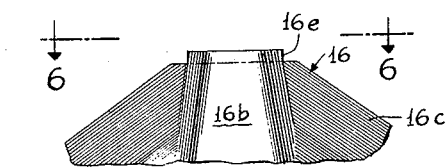
FIG. 7 is a partial side elevation taken on the line 7—7 of FIG. 6.

The invention is illustrated in connection with a stamped-component arc welded automotive truck wheel. The wheel in general is indicated by the numeral 10; a dual rim unit assembly is shown in phantom lines and is generally indicated by the numeral 11; and a brake drum unit is partially shown in phantom lines and is generally indicated by the numeral 12.

The wheel comprises an axially inner or inboard hub member 14, an axially outer hub member 15, an inner web 16, an outer web member 17, and a rim-supporting spoke cap member 18.

The hub members 14 and 15 both flare outwardly from the axially medial plane of the wheel toward opposite ends. The hub members are preferably formed by rolling up formed sheets into truncated cones, flash-welding or fusion-welding the edges together, trimming off the flash metal, and forming the members to final shape by successive die operations. The interior is hardened and shaped to take a spindle and bearings, or a spindle only if the wheel is driven by a spindle. The hubs may be made by other well known die forming and/or swagging methods.

The separate formation of the hub members makes it easy to form an outturned flange 15a on the outer member to provide tapped holes 15b for a hub cap mounting. The inner hub member 14 has a wide opening to provide easy access for making a final assembly arc weld 20 as will be explained later.

Figure 2:
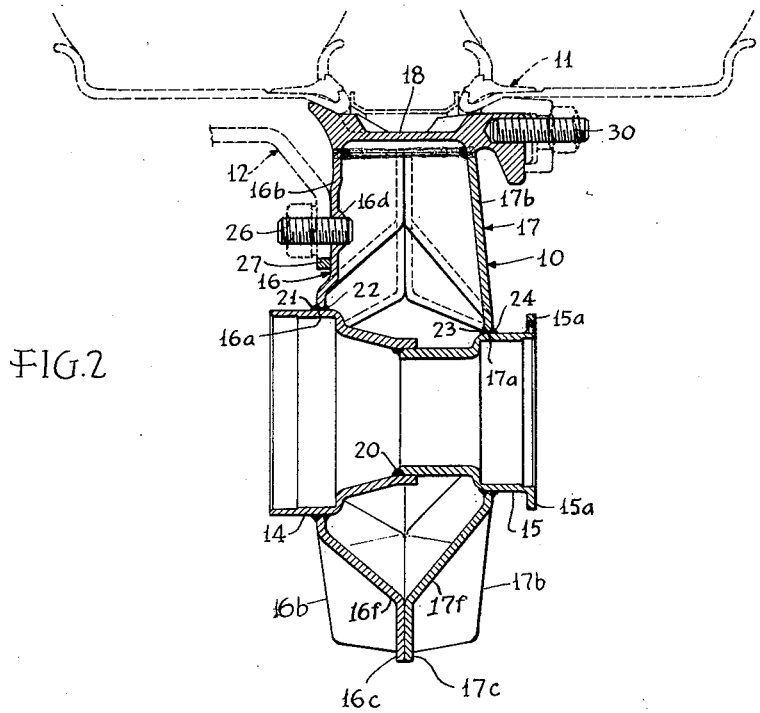
FIG. 2 is a transverse section taken on the line 2—2 of FIG. 1.
Figure 5:
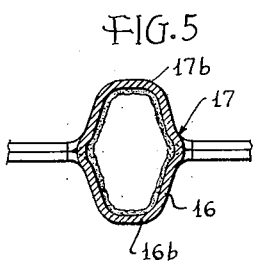
FIG. 5 is a transverse section taken on the line 5—5 of FIG. 1.
Figure 3:
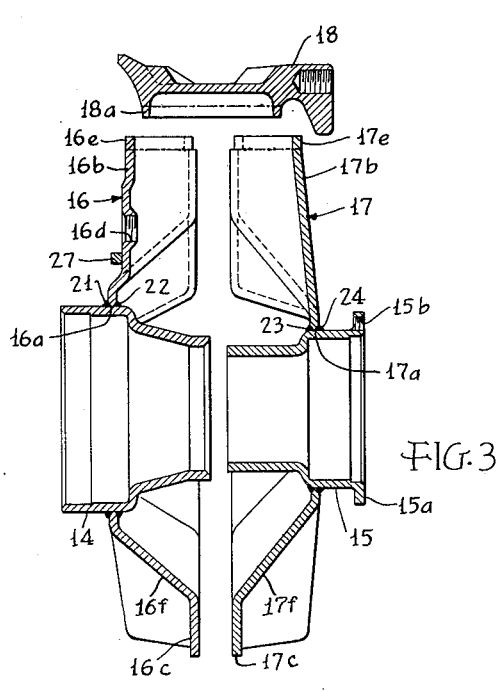
FIG. 3 is an exploded view of the sub-assemblies prior to final assembly.

The web members 16 and 17 are preferably formed as stampings and have radially directed inner peripheral edge portion 16a, 17a respectively which stand approximately normal or radial to the hub parts thereat and are welded thereto on each side at annular arc weld lines 21, 22, 23 and 24. To insure tightness the web members may be force-fitted on the hub members before welding and the parts will be accurately held in a jig during welding. This arrangement avoids axial web flanges along the hub parts with consequent tendency to break loose; and the annular weld lines without axial displacement at any point relative to the hub members assures very strong durable connections. These welds on both sides of the web flange edges are made possible by first forming the web-hub member assemblies separately and securing these sub-assemblies together as a later operation. As shown in FIGS. 2 and 3 the weld 21, 22 and 23, 24 penetrates into the hubs 14 and 15 so as to provide a rigid joint over the bearing seats connecting the web members 16 and 17 to the flared portion of the hubs approximately normal thereto.

The web members 16 and 17 are formed with a plurality of radial spoke portions or elements 16b and 17b respectively and between spokes have facing radial flat plate portions or elements 16c, 17c respectively which in final assembly are secured together in face-abutting relationship, as by resistance welds 25 or other well known welding methods.

The web stampings 16 are formed with flat radial faces having inwardly-punched conical projections 16d which are tapped to take threaded studs 26 to secure the brake drum unit 12. The flat faces can be easily machined for the brake unit flange. Ledges 27, having arcuate outer surfaces to position the inner edge of the brake drum unit flange, are secured to the spokes as by stud welds 28 (FIG. 1).

The spoke caps 18 are preferably secured to the spoke ends by flash welding and for this purpose the caps are provided with inward projections 18a adapted to mate with radial untapered projections 16e, 17e on the spoke ends. The projections are burned down during welding. The inner flash metal remains but the outer flash metal is trimmed off after assembly. However, the caps may be secured by other welding techniques.

It will be noted in FIGS. 2 and 3 between individual spokes the facing radial flat plate portions 16c, 17c are connected to the radially directed inner peripheral edge portions 16a, 17a by axial and radial inclined portions 16f, 17f.

The caps are tapped to take studs 30 for securing the rim assembly thereon.

In making the wheel the parts 14, 15, 16, 17 and 18 are first formed; then the web parts 16 and 17 are welded at 21, 22, 23 and 24 to the hub parts 14 and 15; then the hub parts are welded together at 20 and the plates 16c, 17c are welded together at 25; and then caps are flash-welded or arc welded on the spoke ends.

It is thus seen that the invention provides an improved wheel construction and an improved method of making it.

While one embodiment of the invention has been described by way of illustration it is to be understood that there may be various embodiments and modifications within the general scope of the invention.

What is claimed is:

1. A welded stamped vehicle wheel structure, comprising in combination; two mating hub members interfitted one into the other, each flaring outwardly at its outer end to provide a recess for bearings; two mating web members, each including an annular generally radial inner peripheral edge portion closely fitting on one of said hub members, a plurality of circumferentially spaced spoke portions extending outwardly from said inner peripheral portion, a plurality of flat radial facing plate portions between the spoke portions, and axially and radially inclined portions joining said flat radial facing plate portions with said radial inner peripheral portion; said radial inner peripheral portions being continuously welded on both sides by fillet welds to said hub members; said flat radial facing plate portions being welded together; and said hub members being welded together by a continuous interior annular weld to provide an integral hub wheel structure.

2. A vehicle wheel as set forth in claim 1, further characterized by the fact that one of the web members is formed with a flat portion on each spoke element to seat a brake drum flange and a conical tapped recess within the flat portion to take a stud to hold the drum flange.

3. A vehicle wheel as set forth in claim 1, further characterized by the fact that one of the web members is formed with a flat surface on each spoke element to seat a drum flange and with a lug secured inwardly on the spoke element to position the inner edge of the drum flange.

4. A welded-stamped vehicle wheel structure comprising in combination, two unit sub-assemblies, each including an outwardly flared hub member and a web member having an inner peripheral annular edge welded on both sides to the hub member, the web members having radial spoke elements extending from said edges and between them facing plate elements, the plate elements being welded together and the hub members being telescoped and welded together at their inner mating edges; and a rim-retaining cap member secured to the end of each pair of facing spoke elements to form an end seal therewith.

5. A welded-stamped vehicle wheel structure, comprising in combination; an inner hub member flared outwardly to form an axially inner bearing seat; an outer hub member flared outwardly to form an axially outer bearing seat, said hub members being telescoped one upon the other to provide an inner mating joint; an annular weld connecting the hub members at their inner mating joint; an axially inner web member; an axially outer web member, said web members being provided with spoke element extending from peripheral annular edges substantially normal to and concentrally fitted to said hub members at the bearing seats for transferring the bearing load directly to the spoke elements; and continuous annular welds on both sides of said peripheral annular edges connecting said web members to said hub members.

6. A vehicle wheel structure as set forth in claim 5 further characterized by the fact that said spokes are interconnected by segment shaped flat face web elements, and continuous welds connecting said flat face web elements.

7. A vehicle wheel structure as set forth in claim 6 which further includes a rim-retaining cap welded to the open ends of said spokes to form a sealed end spoke.

8. A pressed steel spoke wheel comprising,
a tubular hub,
flared ends formed on said tubular hub providing a bearing seat at each end of said hub,
a first web member,
a second web member,
a flat radial annular portion on each said web member closely fitted to said tubular hub at said flared ends to provide contact with the tubular hub approximately normal thereto,
a formed portion on said web members extending radially and axially from said radial annular portion,
said formed portion having radial and axial spoke portions,
flat radial web portions between spoke portions, and radial and axially inclined connector portions connecting said spoke portions, said flat radial portions and said radial annular portion,
and annular continuous welds connecting said flat radial annular portion on each web member to said hub at said flared ends approximately normal thereto,
said welds on said flat radial annular portion of said webs being located over said bearing seats,
and welds connecting the flat radial web portions of said web members at their intersection.

9. A pressed steel spoke wheel according to claim 8 being further provided with rim retaining spoke caps welded to said spokes to close off the ends of said spokes.

10. A welded stamped vehicle wheel structure, comprising in combination;
hub means comprising two outwardly flared hub ends, said ends providing seats for bearings;
two mating web members,
each including an annular generally radial inner peripheral edge portion closely fitting on one of said flared ends of said hub member;
a plurality of circumferentially spaced spoke portions extending outwardly from said inner peripheral portion,
a plurality of flat radial facing plate portions between the spoke portions,
and axially and radially inclined portions joining said flat radial facing plate portions with said radial inner peripheral portion;
fillet welds connecting said radial inner peripheral portions of said web members to said flared ends of said hub member;
welds connecting said flat radial facing plate portions of said web members;
and forged rim supporting caps welded to said spaced spoke portions of said connecting web members.

References Cited in the file of this patent
UNITED STATES PATENTS

| | | |
|---|---|---|
| 1,255,927 | Putnam | Feb. 12, 1918 |
| 1,266,155 | Putnam | May 14, 1918 |
| 1,586,425 | Goodyear | May 25, 1926 |
| 1,788,174 | Stanley | Jan. 6, 1931 |
| 1,907,762 | Eksergian | May 9, 1933 |
| 2,046,216 | Steward | June 30, 1936 |
| 2,148,658 | Stiffler | Feb. 28, 1939 |
| 2,548,929 | Ash | Apr. 17, 1951 |
| 2,653,057 | Sherman | Sept. 22, 1953 |
| 2,911,255 | Bellairs | Nov. 3, 1959 |

FOREIGN PATENTS

| | | |
|---|---|---|
| 788,467 | France | July 29, 1935 |
| 603,042 | Great Britain | June 8, 1948 |

OTHER REFERENCES

German printed application 1,081,330, May 5, 1960.